United States Patent [19]

Inglis

[11] Patent Number: 5,189,670
[45] Date of Patent: Feb. 23, 1993

[54] DATA PACKET TRANSMISSION SYSTEM ACCOMMODATING DIFFERENT SUBSTATION RESPONSE TIMES

[75] Inventor: Andrew Inglis, Upwey, Australia

[73] Assignee: U.S. Philips Corporation, New York, N.Y.

[21] Appl. No.: 647,327

[22] Filed: Jan. 28, 1991

[30] Foreign Application Priority Data

Jan. 30, 1990 [AU] Australia .............................. PJ-8392

[51] Int. Cl.$^5$ ........................................... H04L 12/56
[52] U.S. Cl. ................................ 370/94.1; 370/100.1
[58] Field of Search ................. 370/94.1, 110.1, 110.3, 370/60, 100.1, 44, 47, 48, 85.1, 81, 105.1, 105.2

[56] References Cited

U.S. PATENT DOCUMENTS

| 4,777,595 | 10/1988 | Strecker | 370/94.1 |
| 4,821,264 | 4/1989 | Kim | 370/94.1 |
| 4,888,767 | 12/1989 | Furuya | 370/94.1 |
| 4,899,333 | 2/1990 | Roediger | 370/60 |
| 5,003,534 | 3/1991 | Gerhardt | 370/94.1 |
| 5,014,314 | 5/1991 | Mulford | 370/95.1 |

Primary Examiner—Benedict V. Safourek
Assistant Examiner—T. Samuel
Attorney, Agent, or Firm—David R. Treacy

[57] ABSTRACT

Data packets of mutually equal durations are transmitted from a plurality of substations to a main station via one or more transmission channels. The main station transmits on each transmission channel a synchronizing signal which indicates the beginning of a frame. A programmable memory stores maximum link establishment and maximum link disestablishment times which are characteristic of the transmission channel from the substations to the main station. The substations each comprise a programmable memory for storing the maximum establishment times and disestablishment times. On reception of the synchronizing signal on a transmission channel the substation subdivides the frame into a number of consecutive time slots of mutually equal durations at least equal to the sum of the duration of a data packet, and the stored maximum establishment and disestablishment times of that transmission channel. If desired, the substation selects a time slot from the sequence of time slots and transmits the data packet within the selected time slot, beginning at a time equivalent to the stored maximum link establishment time of that transmission channel after the beginning of the selected time slot, and ending at a time equivalent to the stored maximum link disestablishment time of that transmission channel before the end of the selected time slot.

12 Claims, 1 Drawing Sheet

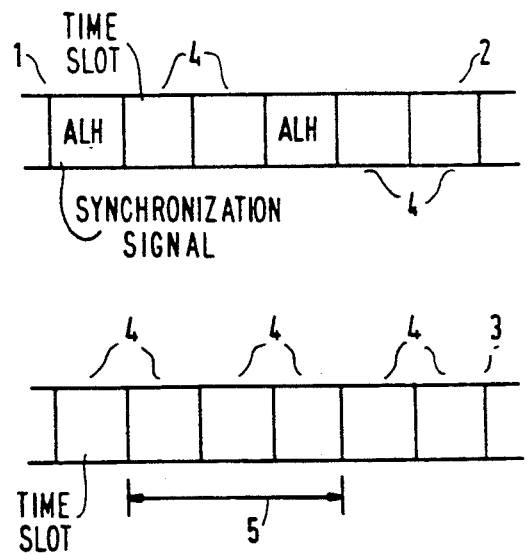
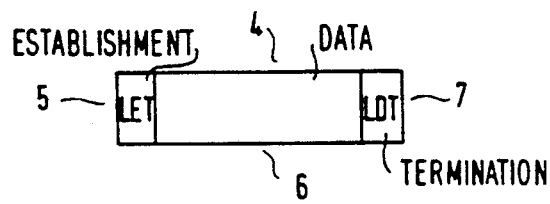
FIG.1A
FIG.1B
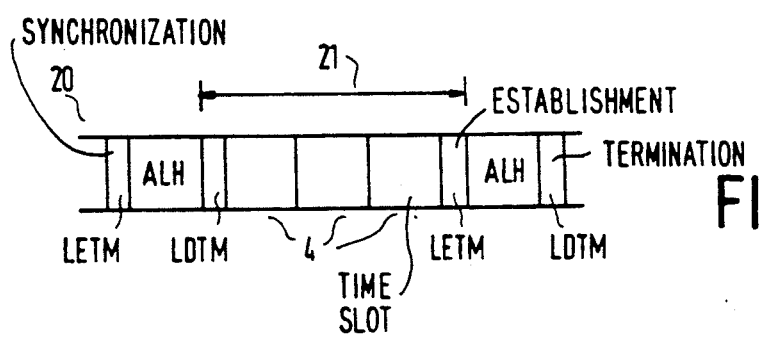
FIG.2
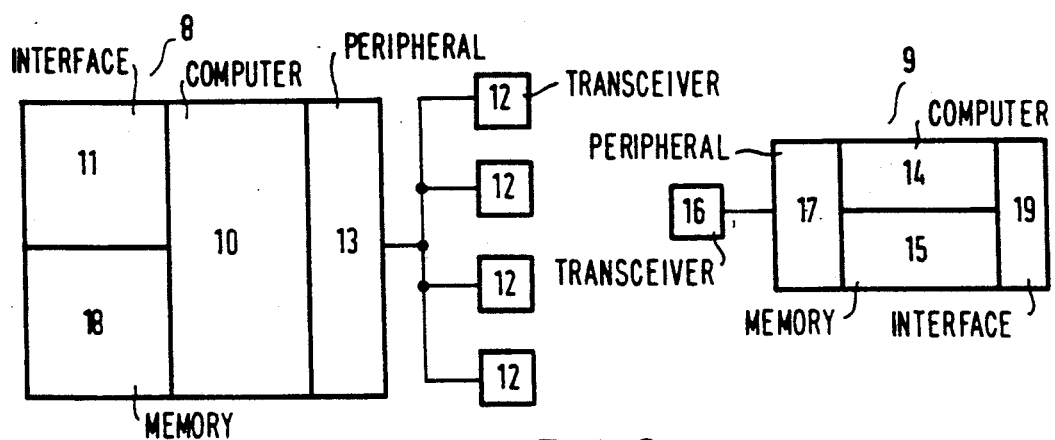
FIG.3

DATA PACKET TRANSMISSION SYSTEM ACCOMMODATING DIFFERENT SUBSTATION RESPONSE TIMES

BACKGROUND OF THE INVENTION

The invention relates to a system for the transmission of data packets of mutually equal durations from a plurality of substations to a main station via one or more transmission channels, the main station comprising transmission means for transmitting on each transmission channel a synchronising signal which indicates the beginning of a frame on reception of the synchronising signal on a transmission channel, each substation subdivides the frame into a number of consecutive time slots of mutually equal durations, and transmits, if so desired, a data packet in a time slot which is selected from the sequence of time slots.

The above system is commonly known as a "slotted ALOHA" system, a particular version of which is described in the UK publication "MPT 1327—A Signalling Standard for Trunked Private Land Mobile Radio Systems", Mar. 26, 1987. This standard requires that the substations, in this instance radio units, shall commence RF transmission, reach 90% of maximum power, transmit the data packets and cease RF transmission so that power is reduced by 60 dB, within specified periods in the time slots. Furthermore in the situation where there exists a forward channel (main station to substations) and a different frequency return channel (substations to main station) the standard requires that the substation shall then return to the forward channel in time to be capable of decoding address codewords. If any one substation does not meet these requirements of the standard it is not permitted to transmit. Otherwise the transmission by a substation will result in crosstalk and corruption of data of that transmission and transmissions of other substations.

This system has the disadvantage that these timing constraints require substations having very fast power up, power down and retuning times which are difficult to implement and result in costly substations. In addition, these timing constraints do not allow for a mixture of substations having different timing parameters. Moreover these timing constraints require an infrastructure, e.g., repeaters, base stations, satellites, etc., also to have fast power up and down times. Any repeaters for instance that have slow power up and down times will result in corruption of the data packets. Thus the implementation of the known system in existing networks may require the upgrading of the infrastructure.

SUMMARY OF THE INVENTION

It is the object of the present invention to minimise the above disadvantages. To this end the invention comprises a system for the transmission of data packets of mutually equal durations from a plurality of substations to a main station via one or more transmission channels, the main station comprising transmission means for transmitting on each transmission channel a synchronising signal which indicates the beginning of a frame, and programmable memory means for storing, in respect of each transmission channel, a maximum link establishment (power up and commerce transmitting) time and a maximum link termination or disestablishment (stop transmitting or power down, and re-tune) time which are characteristic of the transmission channel from the substations to the main station. Each of the substations comprises programmable memory means for storing said maximum link establishment times and said maximum link disestablishment times; means which on reception of the synchronising signal on a transmission channel subdivide the frame into a number of consecutive time slots of mutually equal durations at least equal to the sum of the duration of a data packet, said stored maximum link establishment time and said stored maximum link disestablishment time of that transmission channel; and means for transmitting a data packet, if so desired, by selecting a time slot from the sequence of time slots and transmitting the data packet within a period within the selected time slot, the period beginning at a time equivalent to said stored maximum link establishment time of that transmission channel after the beginning of the selected time slot, and ending at a time equivalent to said stored maximum link disestablishment time of that transmission channel before the end of the selected time slot.

While some substations on a channel will have shorter link establishment times than others on that channel, all of the substations on that channel are able to establish a link with the main station within the time required (i.e. the maximum link establishment time) before transmission of the data packet. Similarly all substations are able to disestablish the link within the time required (i.e. the maximum link disestablishment time) after they finish transmission of the data packet. As a consequence corruption of data due to crosstalk is avoided.

A system according to the invention is more flexible than known systems, in that additional substations may be added to transmission channels, even if the link establishment and/or disestablishment time of a transmission channel from an additional substation to the main station is greater than the stored maximum link establishment and disestablishment times for that channel. Normally this would result in crosstalk and corruption of data. However, because the main station and the substations are each provided with programmable memory means, the link establishment and/or disestablishment times associated with that additional substation may replace the presently respective stored maximum link establishment and/or disestablishment times. Thus that additional substation will be able to establish a link and disestablish the link with the main station within the time required (i.e. the new stored maximum link establishment and disestablishment times) before transmission of a data packet.

A preferred embodiment in accordance with the invention comprises one or more repeaters on one or more said transmission channels for retransmission of said data packets. By their very nature the stored maximum link establishment time and disestablishment time include the maximum power up time and maximum power down time respectively of the repeaters. Thus the present invention may be implemented in existing networks having repeaters which have long power up and power down times without corruption of data.

In a further preferred embodiment in accordance with the invention, the main station and substations each have means for changing the stored maximum link establishment times and maximum link disestablishment times in their respective programmable memory means, in response to changes in the maximum link establishment times and maximum link disestablishment times of the transmission channels. This embodiment is suitable where a substation changes from one transmission channel to another for transmission of a data packet, which may result in changes in maximum link establishment and disestablishment times on the new channel.

In a further preferred embodiment in accordance with the invention, the transmission channels are simplex channels, and the main station and substations have stored in memory further link disestablishment times of respective transmission channels, each being a characteristic of their respective transmission channels from the main station to the substation. The means for changing the stored times subdivide the frame such that the first time slot begins at a time equivalent to the stored further link disestablishment time after the beginning of the synchronising period.

The invention will be described, by way of example, with reference to the accompanying diagrammatic drawings.

BRIEF DESCRIPTION OF THE DRAWING

FIG. 1a shows the signalling protocol for use in an embodiment of the system in accordance with the invention.

FIG. 1b shows the data bit transmission format for use in an embodiment of the system in accordance with the invention.

FIG. 2 shows the signalling protocol for use in another embodiment of the system in accordance with the invention.

FIG. 3 shows a system in accordance with the invention for the transmission of data packets.

DESCRIPTION OF THE PREFERRED EMBODIMENTS

FIG. 1a illustrates the signalling protocol used on a transmission channel of the system. The system may have one or more transmission channels, each of which use the same signalling protocol. The transmission channel 1 is a duplex channel having a forward channel 2 for transmitting data from the main station to the substations and a return channel 3 for transmitting data from the substations to the main station. Each of the forward and return channels 2,3 are divided into time slots 4 each having a duration of 107 ms having a length of 128 bits at 1200 bits/s. The main station transmits on the forward channel 2 a synchronisation signal indicated by ALH to invite the substations to transmit data packets. The ALH message contains a parameter (N) which indicates the number of following time slots 4, constituting a frame 5, which are available for access by the substations. If a frame 5 is already in progress when a call from a substation is initiated the substation may transmit on the return channel 3 in the next immediate time slot. Otherwise, the substation waits for a new frame 5 to be started and then chooses a time slot 4 at random from the frame for its transmission on the return channel 3. Where two or more substations randomly select the same time slot 4 and transmit data on the return channel 3 in that time slot, corruption of data will occur due to clashing. In these circumstances the substations randomly select another time slot 4 in a new frame 5 and repeat the transmission. The main station monitors the traffic activity on the return channel 3 and optimises the system performance by varying the frame length by changing the number of following time slots (the parameter N) so as to prevent excessive clashing and to minimise access delays. The system described so far is known from the UK publication "MPT 1327—A Signalling Standard for Trunked Private Land Mobile Radio Systems", Mar. 26, 1987.

FIG. 1b shows a typical time slot 4 and the format of the data bit transmissions from the substations to the main station within that time slot 4. All of the time slots on the transmission channels have a similar format wherein the start 5 of a time slot 4 is followed by a link establishment phase or time LET, a data transmission period 6, a link disestablishment phase or time LDT and the end 7 of that time slot 4. The durations of the link establishment phase LET, the period 6, the link disestablishment phase and consequently the duration of the time slots 4 themselves are the same on any one particular transmission channel, though the durations of the link establishment phase LET and link disestablishment phase LDT and consequently the duration of the time slots 4 may differ from transmission channel to transmission channel. The data is transmitted by the substation as a data packet of fixed duration within the period 6, the duration of which period 6 is the same for all transmission channels. The duration of the period 6 may be the same as or longer than the duration of the data packet. The data packet may be of a similar format to that described in the "MPT standard 1317—Coded Practice—Transmission of Digital information over Land Mobile Radio Systems" April 1981 or any other format of a fixed duration.

The duration of the link establishment phase of the time slots 4 for a particular transmission channel is chosen to be equal to the maximum time it takes for establishing a radio link between any one of the substations and the main station on the return channel 2 of that particular, transmission channel. Similarly the duration of the link termination or disestablishment phase of the time slots 1 for a particular transmission channel is chosen to be equal to the maximum time it takes for disestablishing terminating a radio link between any one of the substations and the main station on the return channel 2 of that particular transmission channel. The maximum link establishment and disestablishment times of the system may be determined by the system engineers at the design phase of the system or at any future upgrade of the system and program these times into the programmable memory means of the main station and substations.

The maximum link establishment time for a transmission channel is a characteristic of that channel and by its very nature includes the longest time needed for the slowest substation to power up to the required level for data transmission. Also the maximum link transmitting disestablishment time for a transmission channel is a characteristic of that channel and by its very nature includes the longest time needed for the slowest substation to power down to the required level and cease RF transmission. The maximum link establishment and disestablishment times may also include the times needed by the substation to retune from the forward channel to the return channel and from the return channel to the forward channel respectively.

The system may also include in its infrastructure such things as repeaters, satellites, base stations etc. Thus the maximum time needed to establish a link between the substations and the main station on that channel, that is the maximum link establishment time, will also include the maximum time needed for establishing the link via the infrastructure. Similarly disestablishment includes the maximum times required by the link between the substations and the main station via the infrastructure.

In a particular embodiment of the system, the system may include on one or more of its transmission channels one or more repeaters. In these circumstances the maximum link establishment and disestablishment times will also include, in addition to the longest power up and power down times respectively of the substations on that transmission channel, the longest power up and power down times of the repeaters respectively of that channel. In this particular embodiment the receivers of the repeaters on the return channel on the transmission channel are continuously powered up. Upon receipt of a data packet from a substation the repeater powers up its transmitter and retransmits the data packet to the main station. Thus the maximum time needed to establish a link from the substations to the main station on that channel, i.e. the maximum link establishment time, will include in addition to longest power up time of the substations on that channel, the maximum time needed for the power up of any one of the repeaters on that channel and the retransmission of the data packet. Similar circumstances apply for the disestablishment of the link between the substations and the main station via the repeaters on that channel.

In FIG. 3 the system for the transmission of data packets comprises a main station 8 and a number of fixed or mobile substations 9 which may be scattered over a wide geographical area, only one of which substations 9 is shown. The main station 8 comprises a central computer 10 having associated user interface means 11 for communicating with the substations 9, and associated programmable memory means 18. The main station 8 further comprises a number of transceivers 12 coupled to the central computer 10 via peripheral equipment 13 for transmitting and receiving data over a number of transmission control channels. Each of the substations 9 comprises a computer 14 having associated user interface means 19 for communicating with the main station, and associated programmable memory means 15. The computer 14 is coupled to a transceiver 16 via peripheral equipment 17 for transmitting and receiving data over a number of transmission control channels. The main station 8 has stored in the programmable memory means 18 the maximum link establishment time and maximum link disestablishment time for each transmission control channel, and each substation 9 has stored in the programmable memory means 15 the maximum link establishment time and maximum link disestablishment time for each transmission control channel.

In operation the central computer 10 of the main station 8 monitors the traffic activity on the return channel 3 of a transmission channel and determines the number of time slots 4 for the next frame 5. The central computer 10 of the main station 8 determines the duration of those time slots by accessing the maximum link establishment time and maximum link disestablishment time stored in the programmable memory means 18 for the return channel, of that transmission channel and accessing the fixed duration of a data packet either stored in the programmable memory means 18 or other memory means of the central computer. The central computer 10 then causes the appropriate transceiver 12 via the peripheral equipment 13 to transmit an ALH message informing the substations 9 on that transmission control channel of the number of time slots in that frame. The frame is completed with the transmission of a further ALH message by the main station. Any substation 9 desiring to transmit a data packet within that frame determines by means of its computer 14 the start of the time slots from the information received concerning the number of time slots in the ALH message beginning that frame, and the durations of those time slots. The durations of those time slots is determined by the computer 14 accessing the maximum link establishment time and maximum link disestablishment time for that transmission channel stored in the programmable memory means 15 of the substation, and accessing the fixed duration of a data packet either stored in the programmable memory means 15 or other memory means of the substation 9. The computer 14 of the substation then randomly selects a time slot within that frame and initiates the transceiver 16 via the peripheral equipment 17 to begin powering up at the beginning of that randomly selected time slot. The substation 9 then transmits the data packet at a time equivalent to the stored maximum link establishment time after the star of that time slot. While a particular substation may be able to establish a link prior to this time, it is in this manner that slower substations are always able to establish a link without causing crosstalk and corruption of data. The substation after finishing completion of its transmission of the data packet then powers down by the start of the next time slot.

The system may also allow substations to transmit data packets on more than one transmission channel. In the situation where a substation changes from one transmission channel to another the substation informs the main station on its previous channel of its own characteristic link establishment and disestablishment times, so that the main station can make appropriate changes to the stored maximum link establishment time and maximum link disestablishment time of the new channel and also inform all the substations on that new channel to make appropriate changes to their stored maximum link establishment and disestablishment times, if this is necessary. Alternatively, the stored maximum link establishment and disestablishment times of a channel are determined from all the substations which are capable of transmitting on that channel.

FIG. 2 shows the signalling protocol for use in another embodiment of the system where the transmission channels are simplex channels. In this embodiment both the main station and substations use the same simplex channel 20 for transmission of data. In order to avoid crosstalk from a transmission from the main station and a transmission from a substation, the time slots 4 of the frame 21 begin after the maximum link disestablishment time (LDTM) of the transmission channel from the main station to the substation (i.e. in the forward direction) and finish prior to the link establishment time (LETM) of the transmission channel from the main station to the substation (i.e. in the forward direction) for that particular channel. In all other respects the signalling protocol and the durations of the time slots are the same as those of FIGS. 1a and 1b. In this embodiment the main station has further stored in its programmable memory means the link disestablishment time (LDTM) and the link establishment time (LETM) for each transmission channel and from these times, the number of time slots, the maximum link establishment (LET) and disestablishment (LDT) times of that transmission channel from the substations to the main station (i.e. in the return direction), and the duration of the data packet, the central computer 10 of the main station determines the length of the frame. The substations 9 have further stored in their programmable memory means the link disestablishment time (LDTM) for each transmission channel. The computer 14 of a substation by accessing the programmable memory means for the link disestablishment time (LDTM) for that particular channel (i.e. in the forward direction) and from the number of time slots, the maximum link establishment (LET) and disestablishment (LDT) times of that transmission channel (i.e. in the return direction) and the duration of the data packet is able to determine when the time slot begins and the period in which it is allowed to transmit their data packets.

As will be apparent from the foregoing, variations, modifications, and/or additions, and/or subtractions to the above embodiments are possible without departing from the scope of the invention.

The claims defining the invention are as follows:

1. A system for transmitting data packets of mutually equal given duration over one or more transmission channels, comprising a main station and a plurality of substations, wherein said main station comprises means for transmitting on each transmission channel a synchronizing signal which indicates the beginning of a frame, characterized in that said main station comprises programmable memory means for storing, with respect to each said channel, a maximum link establishment time and a maximum link termination time, and each substation comprises programmable memory means for storing, with respect to each channel, said maximum link establishment time and said maximum link termination time, dividing means, responsive to reception of said synchronizing signal on one of said channels, for subdividing said frame into a sequence of consecutive time slots of mutually equal durations at least equal to the sum of said given duration and the respective stored maximum link establishment and termination times for said one channel, means for transmitting a selected data packet by selecting one time slot from said sequence of consecutive time slots; transmitting said selected data packet during a time period delayed after the beginning of said one time slot by a time duration equivalent to said stored maximum link establishment time, and terminating transmission of said packet at a time before the end of said selected time slot by a time duration equivalent to said stored maximum link termination time.

2. A system as claimed in claim 1, wherein the system comprises an infrastructure for one or more of the transmission channels for transmitting data via the infrastructure between the main station and substations.

3. A system as claimed in claim 2, wherein the system comprises one or more repeaters on one or more said transmission channels for retransmission of said data packets.

4. A system as claimed in claim 3, wherein the main station and substations each have means for changing the stored maximum link establishment times and maximum link termination times in their respective programmable memory means, in response to changes in the maximum link establishment times and maximum link termination times of the transmission channels.

5. A system as claimed in claim 4, wherein the transmission channels are simplex channels, and the main station has stored in the programmable memory means further link establishment times and link termination times of respective transmission channels, each being a characteristic of their respective transmission channels from the main station to the substation; the substations have stored in their programmable memory means said further link establishment and termination times; and said dividing means subdivides the frame such that the first time slot begins at a time equivalent to the stored further link termination time after the beginning of the synchronizing period.

6. A system as claimed in claim 3, wherein the transmission channels are simplex channels, and the main station has stored in the programmable memory means further link establishment times and link termination times of respective transmission channels, each being a characteristic of their respective transmission channels from the main station to the substations; and the substations have stored in their programmable memory means said further link establishment and termination times; and said dividing means subdivides the frame such that the first time slot begins at a time equivalent to the stored further link termination time after the beginning of the synchronizing period.

7. A system as claimed in claim 2, wherein the transmission channels are simplex channels, and the main station has stored in the programmable memory means further link establishment times and link termination times of respective transmission channels, each being a characteristic of their respective transmission channels from the main station to the substations; and the substations have stored in their programmable memory means said further link establishment and termination times; and said dividing means subdivides the frame such that the first time slot begins at a time equivalent to the stored further link termination time after the beginning of the synchronizing period.

8. A system as claimed in claim 1, wherein the transmission channels are simplex channels, and the main station has stored in the programmable memory means further link establishment times and link termination times of respective transmission channels, each being a characteristic of their respective transmission channels from the main station to the substations; and the substations have stored in their programmable memory means said further link establishment and termination times; and said dividing means subdivides the frame that the first time slot begins at a time equivalent to the stored further link termination time after the beginning of the synchronizing period.

9. A system as claimed in claim 2, wherein the main station and substations each have means for changing the stored maximum link establishment times and maximum link termination times in their respective programmable memory means, in response to changes in the maximum link establishment times and maximum link termination times of the transmission channels.

10. A system as claimed in claim 9, wherein the transmission channels are simplex channels, and the main station has stored in the programmable memory means further link establishment times and link termination times of respective transmission channels, each having a characteristic of their respective transmission channels from the main station to the substations; and the substations have stored in their programmable memory means said further link establishment and termination times; and said dividing means subdivides the frame such that the first time slot begins at a time equivalent to the stored further link termination time after the beginning of the synchronizing period.

11. A system as claimed in claim 1, wherein the main station and substations each have means for changing the stored maximum link establishment times and maximum link termination times in their respective programmable memory means, in response to changes in the maximum link establishment times and maximum link termination times of the transmission channels.

12. A system as claimed in claim 11, wherein the transmission channels are simplex channels, and the main station has stored in the programmable memory means further link establishment times and link termination times of respective transmission channels, each being a characteristic of their respective transmission channels from the main station to the substations; and the substations have stored in their programmable memory means said further link establishment and termination times; and said dividing means subdivides the frame such that the first time slot begins at a time equivalent to the stored further link termination time after the beginning of the synchronizing period.

* * * * *